United States Patent [19]

Brown

[11] 4,183,242
[45] Jan. 15, 1980

[54] DIGITAL TORQUE METER WITH REVERSE ROTATION AND VIBRATION DATA CORRECTION

[75] Inventor: Winthrop K. Brown, Bellaire, Tex.
[73] Assignee: Texaco Inc., White Plains, N.Y.
[21] Appl. No.: 900,963
[22] Filed: Apr. 28, 1978
[51] Int. Cl.² ........................... G01L 3/10
[52] U.S. Cl. ............................. 73/136 A
[58] Field of Search ............ 73/136 A; 324/83 D

[56] References Cited

U.S. PATENT DOCUMENTS

| | | | |
|---|---|---|---|
| 3,274,826 | 9/1966 | Ingram | 73/136 XA |
| 3,640,131 | 2/1972 | Turk | 73/136 A |
| 3,646,455 | 2/1972 | Coccagna | 324/83 D X |
| 3,960,012 | 6/1976 | Ingram | 73/136 A |
| 4,020,685 | 5/1977 | Van Millingen et al. | 73/136 |

*Primary Examiner*—Charles A. Ruehl
*Attorney, Agent, or Firm*—Robert A. Kulason; Carl G. Ries; Ronald G. Gillespie

[57] ABSTRACT

A torque meter for measuring the torque of a rotating shaft includes at least two sensing devices providing pulses corresponding to the rotation of the shaft. A pulse source provides clock pulses. A network connected to the sensors determines if the shaft is rotating in the proper direction and provides a signal accordingly. A circuit receiving the pulses from the sensors, the signal from the network and the clock pulses provides groups of clock pulses wherein the number of pulses in each group corresponds to the torque of the shaft when the shaft is rotating in the proper direction.

18 Claims, 10 Drawing Figures

FIG. 2A  $E_2$ 
FIG. 2B  $E_1$ 
FIG. 2C  $E_2$ 
FIG. 2D  $E_1$ 
FIG. 2E  $E_1$ 
FIG. 2F  $E_2$ 
FIG. 2G  $E_1$ 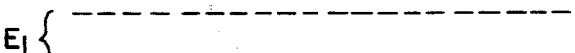
FIG. 2H  $E_2$ 
FIG. 3
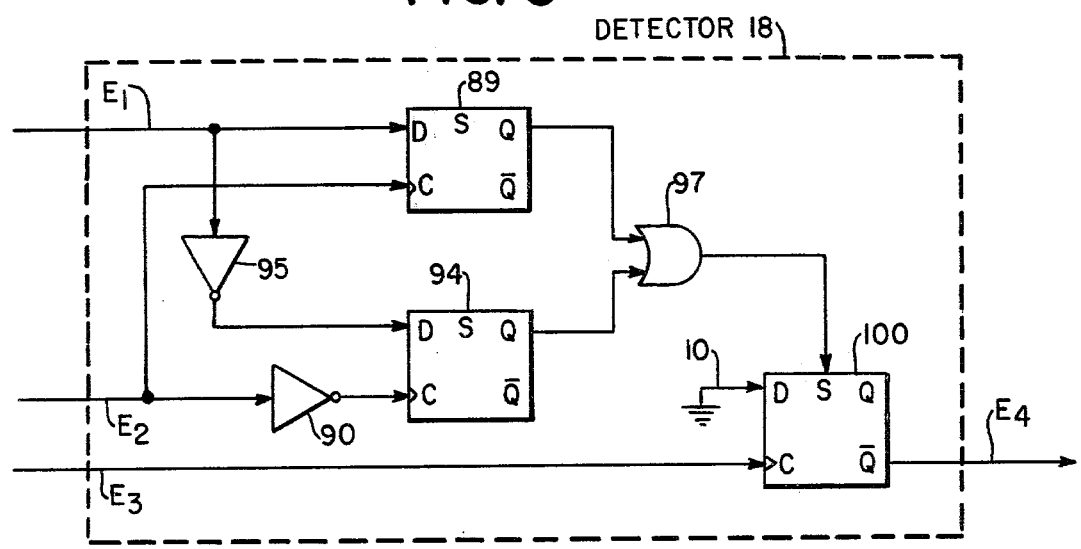

DIGITAL TORQUE METER WITH REVERSE ROTATION AND VIBRATION DATA CORRECTION

BACKGROUND OF THE INVENTION

Field of the Invention

The present invention relates to meters in general and, more particularly, to torque meters.

SUMMARY OF THE INVENTION

A torque meter for measuring a torque on a rotating shaft includes at least two sensors having a predetermined relationship to the shaft and providing shaft pulses at the same frequency but differing in phase, said phase difference corresponding to the torque of the shaft. A clock provides clock pulses having a substantially greater frequency than the frequency of the shaft pulses. A circuit determines if the shaft is rotating in a proper direction and provides a signal accordingly. A network connected to the sensors, to the circuit and to the pulse source provides groups of clock pulses in accordance with the shaft pulses and the signal from the circuit so that the number of pulses in each group corresponds to the torque of the shaft when the shaft is rotating in the proper direction.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 2A through 2H are graphical representations of voltages occurring during operation of the torque meter of FIG. 1.

FIG. 3 is a detailed block diagram of the detector shown in FIG. 1.

DESCRIPTION OF THE INVENTION

Figure 1:
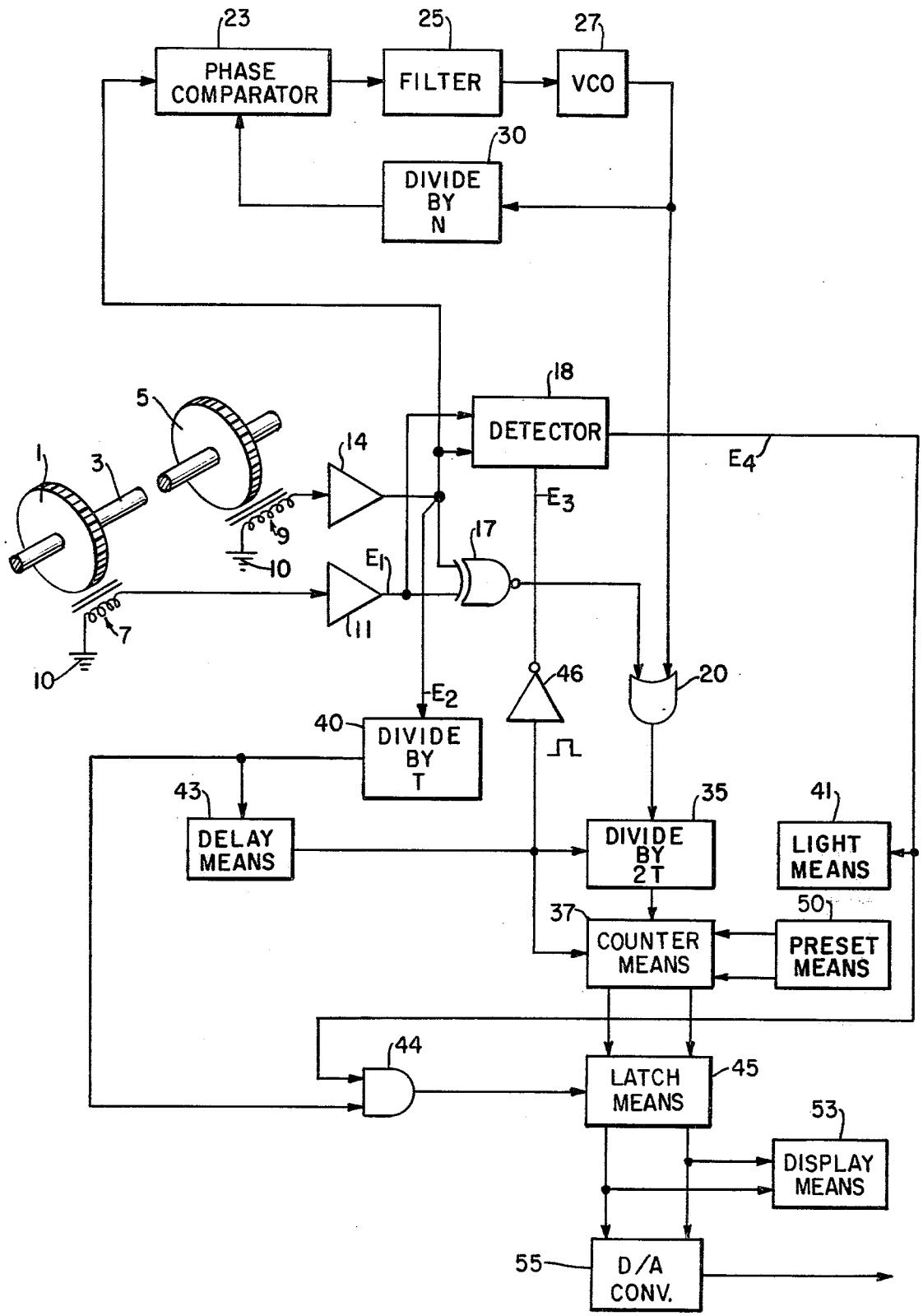
FIG. 1 is a simplified block diagram of a torque meter, constructed in accordance with the present invention for measuring the torque in a rotating shaft.

Referring to FIG. 1, there is shown a torque meter having a wheel 1, with teeth mounted on a shaft 3. At another location on shaft 3, there is mounted another wheel 5 substantially identical to wheel 1. As shaft 3 is rotated, the teeth in wheels 1, 5, pass pick-up coils 7 and 9, respectively, which are connected to ground 10. Each coil has a magnetized core. An alternate arrangement would have each tooth of the wheels magnetized instead of the cores of the coils. As each tooth passes a corresponding coil an electric voltage is induced therein so that during rotation of shaft 3, coils 7 and 9 provide pulses.

The pulses from coils 7, 9 are applied to squaring amplifiers 11 and 14, respectively, which provide pulses $E_1$ and $E_2$, respectively, as shown in FIGS. 2B and 2A, respectively. Squaring amplifiers 11 and 14 may be omitted if the pulses provided by coils 7, 9 are suitable. Pulses $E_1$, $E_2$ from squaring amplifiers 11 and 14, respectively, are applied to an exclusive NOR gate 17 and to a detector 18.

When amplifiers 11, 14 are simultaneously providing a pulse $E_1$ and $E_2$, exclusive NOR gate 17 provides a high logic level output. When one and only one of the amplifiers 11 or 14 is providing a pulse, exclusive NOR gate 17 provides a low logic level output. If both amplifiers 11 and 14 are not providing a pulse exclusive NOR gate 17 produces a high output. Thus, the duration of a low output from exclusive NOR gate 17 corresponds to the torque. The output from exclusive NOR gate 17 is applied to an OR gate 20.

Pulses $E_2$ are applied to a phase lock-loop comprising a phase comparator 23 providing a voltage to a filter 25 which provides a filtered voltage to a voltage controlled oscillator 27. The voltage provided by comparator 23 corresponds to the phase difference between pulses $E_2$ from amplifier 14 and other pulses applied to comparator 23, as hereinafter explained. Oscillator 27 provides a plurality of clock pulses whose frequency is determined by the voltage applied to oscillator 27. The clock pulses are provided to a 'divide by N' divider 30 whose pulses are applied to phase comparator 23. In operation oscillator 27 provides the clock pulses at a frequency N times greater than the frequency of pulses $E_2$ provided by squaring amplifier 14.

The clock pulses from oscillator 27 are provided to OR gate 20. OR gate 20 provides an output to a 'divide by 2 T' divider 35 where T is the number of teeth on either wheel 1 or 5. The operation of exclusive NOR gate 17 and OR gate 20 is such that while amplifiers 11 and 14 simultaneously are providing pulses $E_1$ and $E_2$, respectively, the high output from NOR gate 17 in effect blanks out the clock pulses from oscillator 27. When one of the amplifiers 11, 14, does not provide a pulse, while the other amplifier is providing a pulse, OR gate 20 provides pulses to divider 35. The pulses from divider 35 are provided to counter means 37 for counting.

The pulses from amplifier 14 are applied to a 'divide by T' divider 40 which in effect provides a pulse for every complete rotation of wheel 5. The pulses from divider 40 are applied to delay means 43 and to an AND gate 44. Delay means 43 provides a delayed pulse to divider 35, to counter means 37, and to an inverter 46. The leading edge of the delayed pulse resets divider 35 and counter means 37 while the trailing edge loads counter means 37 with digital signals provided by preset means 50. Inverter 46 provides inverted pulses $E_3$ to detector 18 which provides a control signal $E_4$ to light means 41 and to an AND gate 44. AND gate 44 is controlled by signal $E_4$ to pass or block the pulses from 'divide by T' 40. The passed pulses are provided to latch means 45.

Referring now to FIGS. 1, 2A through 2H, and 3, detector 18 determines whether the shaft is rotating in a wrong direction or that amplifier 14 is providing pulses as a result of vibration or noise. Reverse rotation yields an erroneous indication since the teeth on wheels 1 and 5 are rarely in alignment and do not have the same dimensions due to machining errors. There is a small offset in the number of pulses occurring when the shaft is rotating in one direction which is accounted for in calibrating the torque meter. However, when the shaft is rotating in an opposite direction a different offset in the number of pulses occurs which results in an erroneous count in counter means 37. Should either of these conditions occur, the current erroneous data is prevented from entering latch means 45 so that latch means 45 provides the latest valid data.

Pulses $E_2$ are applied to the clock or 'C' input of 'D' type flip-flop 89 and to an inverter 90, while pulses $E_1$ are applied to the data or 'D' input of 'D' type flip-flop 89 and to an inverter 95. Inverters 90, 95 provide inverted pulses $E_2$ and $E_1$, respectively, to the 'C' input and the D input, respectively, of flip-flop 94. The Q outputs of flip-flops 89, 94 are provided to an OR gate 97. OR gate 97 is connected to a set or 'S' input of yet another 'D' type flip-flop 100. Pulses $E_3$ are applied to the 'C' input of flip-flop 100 while flip-flop 100 'D' input is grounded. Flip-flop 100 provides its $\bar{Q}$ output as signal $E_4$. A 'D' type flip-flop will provide its Q and $\bar{Q}$ outputs at low and high logic levels, respectively, when in a clear state and at high and low logic levels, respectively, when in a set state. Further, when an input of one logic level is applied to the 'D', the flip-flop is triggered by a rising pulse to provide a Q output at the same logic level as provided to the 'D' input.

In normal operation, pulses $E_1$ lag pulses $E_2$. Thus, when pulse $E_2$ is rising pulse $E_1$ is low so that flip-flop 89 is triggered to provide its Q output at a low logic level. Similarly, due to the effect of inverters 90 and 95, flip-flop 94 is triggered by the trailing edge of pulses $E_2$ to provide its Q output at a low logic level. Thus for normal rotation both flip-flops 89, 94 provide low logic level Q outputs to OR gate 97 causing it to provide a low logic level output to flip-flop 100. Flip-flop 100 is not affected by the low logic level output from OR gate 97 and continues to provide signal $E_4$ at a high logic level.

When reverse rotation occurs, pulses $E_1$ lead pulses $E_2$ as is shown in FIGS. 2C and 2D so that pulse $E_1$ is at a high level when pulse $E_2$ rises. In response to this condition, flip-flop 89 is triggered to provide its Q output at a high logic level. Once this occurs, flip-flop 94 is of no importance. Since flip-flop 89 is at a high logic level, OR gate 97 provides a high level output triggering flip-flop 100 to a set state. While in a set state, flip-flop 100 provides signal $E_4$ at a low logic level to disable AND gate 44 to prevent the entry of data into latch means 45. Thus latch means 45 provides signals corresponding to the last valid data obtained. Further, signal $E_4$ is going to a low logic level causes light means 42 to light thus visibly indicating malfunctioning.

Signal $E_3$, as can be seen in the description regarding FIG. 1, is a pulse which occurs every cycle. Its occurrance when flip-flop 100 is in a set state, resets flip-flop 100 to a clear state causing signal $E_4$ to go to a high logic level. Latch means 45 can then again enter valid data.

When noise or vibration causes an amplifier 11 or 14 to provide an erroneous output, that condition may be seen either in FIGS. 2E, 2F or 2G, 2H. With regard to FIGS. 2F and 2G, the output of an amplifier 11 or 14 should be at a steady state, which may be at a high logic level or at a low logic level. The solid line is for a low logic level, while the dash line represents a high logic level steady output. When pulse $E_1$ does not occur and the output of amplifier 11 is at a high logic level, flip-flop 89 is triggered by the leading edge of a pulse $E_2$. Similarly if the signal from amplifier 11 is at a steady state low logic level, the trailing edge of a pulse $E_2$ triggers flip-flop 94 to provide its Q output at a high logic level. As noted hereinbefore, a high logic level Q output from either flip-flop 89 or 94, causes flip-flop 100 to be triggered to a set state.

A final erroneous condition, that is where amplifier 14 provides a steady state signal, while noise or vibration cause amplifier 11 to provide pulses $E_1$, is not controlled by detector 89 but by the inherent operation of system itself. Since amplifier 14 is not providing pulses $E_2$, 'divide by T' 40 does not provide a pulse therefor, latch means 45 cannot enter the erroneous data.

It would be obvious to one skilled in the art that if only reverse rotation was to be detected flip-flop 89 would be needed solely or in conjunction with flip-flop 106. For the solo case, flip-flop 89 would provide its output as signal $E_4$ and there would be no cyclic resetting of flip-flop 89. The resetting would occur with normal rotation.

The invention hereinbefore described is a digital torque meter for measuring the torque on a rotating shaft. The torque is determined by developing two signals whose difference in phase corresponds to the torque experienced by the shaft. The phase difference is then used to generate pulses corresponding in number to the torque. The pulses are then counted, displayed and recorded. The torque meter does not record and display erroneous data due to reverse rotation of the shaft or due to vibration or noise.

What is claimed is:

1. A torque meter for measuring the torque of a shaft comprising at least two sensing means affixed to the shaft and providing shaft pulse signals at the same frequency but having a phase difference corresponding to the torque of the shaft as the shaft rotates in a predetermined direction, means for providing clock pulses, means connected to both sensing means for detecting reverse rotation of the shaft and providing a detection signal, circuit means connected to the two sensing means, to the detecting means and to the clock pulse means for providing groups of clock pulses in accordance with the shaft pulse signals and the detection signal so that the number of clock pulses in each group corresponds to the torque of the shaft when the shaft rotates in the predetermined direction, and indicating means connected to detecting means for indicating reverse rotation of the shaft in accordance with the detection signal.

2. A torque meter as described in claim 1 in which each sensing means includes a wheel having teeth mounted on the shaft, and coil means placed adjacent to the wheel for providing a pulse each time a tooth on the wheel passes the coil means.

3. A torque meter as described in claim 2 in which the circuit means includes an exclusive NOR gate connected to the coil means for providing a low logic level signal when the shaft pulse signals are not at substantially the same amplitude and for providing a high logic level signal when the shaft pulse amplitudes are substantially the same, and an OR gate connected to the exclusive OR gate and to the clock pulse means for providing the groups of clock pulses in accordance with the signal from the exclusive NOR gate.

4. A torque meter as described in claim 3 in which the clock pulse means includes a phase comparator means connected to one of the coil means and receiving its shaft pulse signal, a first divider means connected to the phase comparator means for providing pulses at a rate of one pulse for every N pulses it receives, said phase comparator means providing a voltage output in accordance with the phase comparison, means for filtering the voltage from the phase comparator means to provide a filtered voltage, and a voltage-controlled oscillator connected to the filter means, to the first divider means and to the OR gate for providing the clock pulses in accordance with the filtered voltage to the first divider means and to the OR gate.

5. A torque meter as described in claim 4 further comprising second divider means for dividing the number of pulses in each group of pulses from the OR gate by twice the number of teeth on a wheel, third divider means connected to one of the coil means for dividing the number of pulses in the shaft pulse signal by the number of teeth on a wheel so as to provide a pulse every time the coil means' associated wheel has been turned through 360°, delay means connected to the third divider means for delaying the pulse from the third divider means to provide a delayed pulse to the second divider means, counter means connected to the second divider means and to the delay means for being periodically reset by the delayed pulse and for counting the number of pulses provided by the second divider means and for providing signals corresponding to the count, an AND gate connected to the detecting means and to the third divider means is controlled by the detection signal to pass or to block the pulses from the third divider means, latch means connected to the counter means and to the AND gate for storing the signals from the counter means in response to passed pulses from the AND gate so as not to change while the counter means is counting and so as not to enter signals from the counter means produced by reverse rotation of the shaft and for providing digital signals corresponding to the stored signals.

6. A torque meter as described in claim 5 in which the detecting means includes a first flip-flop having a 'D' input connected to one of the coil means, a 'C' input connected to the other coil means and a Q output; first and second inverters connected to the one coil means and to the other coil means, respectively; a second flip-flop having a 'D' input connected to the first inverter, a 'C' input connected to the second inverter and a Q output; an OR gate having its inputs connected to the Q outputs of the first and second flip-flops and an output; a third inverter connected to the delay means; and a third flip-flop having a D input that is grounded, an 'S' input connected to the output of the OR gate, a 'C' input connected to the third inverter, and a $\overline{Q}$ output connected to the AND gate so that when the shaft is rotating in a proper direction the signal at the $\overline{Q}$ output of the third flip-flop is at a high logic level causing the AND gate to pass the pulses from the third divider means and when the shaft rotates in a reverse direction the signal at the $\overline{Q}$ output is at a low logic level causing the AND gate to block the pulses from the third divider means.

7. A torque meter as described in claim 6 further comprising a digital to analog converter connected to the latch means for converting the digital signals to an analog signal.

8. A torque meter as described in claim 6 further comprising display means connected to the latch means for providing a display corresponding to the torque of the shaft in accordance with the digital signals from the latch means.

9. A torque meter as described in claim 7 in which the counter means includes a counter connected to the second divider means and to the delay means for counting pulses from the second divider means and being reset by the delayed pulse to provide digital signals corresponding to the count, and preset means for presetting a count into the counter means corresponding to a known alignment error between the two wheels.

10. A torque meter for measuring the torque of a shaft comprising at least two sensing means affixed to the shaft and providing shaft pulse signals at the same frequency but having a phase difference corresponding to the torque of the shaft as the shaft rotates in a predetermined direction; means for providing clock pulses; means connected to both sensing means for detecting reverse rotation of the shaft as an erroneous shaft pulse signal from at least one of the sensing means and providing a detection signal corresponding thereto; circuit means connected to both sensing means, to the detecting means and to the clock pulse means for providing groups of clock pulses in accordance with the shaft pulse signals and the detection signal so that the number of clock pulses in each group corresponds to the torque of the shaft when the shaft rotates in the predetermined direction; and indicating means connected to the detecting means for indicating reverse rotation or an erroneous shaft pulse signal in accordance with the detection signal.

11. A torque meter as described in claim 10 in which each sensing means includes a wheel having teeth mounted on the shaft, and coil means placed adjacent to the wheel for providing a pulse each time a tooth on the wheel passes the coil means.

12. A torque meter as described in claim 11 in which the circuit means includes an exclusive NOR gate connected to the coil means for providing a low logic level signal when the shaft pulse signals are not at substantially the same amplitude and for providing a high logic level signal when the shaft pulse amplitudes are substantially the same, and an OR gate connected to the exclusive NOR gate and to the clock pulse means for providing the groups of clock pulses in accordance with the signal from the exclusive NOR gate.

13. A torque meter as described in claim 12 in which the clock pulse means includes a phase comparator means connected to one of the coil means and receiving its shaft pulse signal, a first divider means connected to the phase comparator means for providing pulses at a rate of one pulse for every N pulses it receives, said phase comparator means providing a voltage output in accordance with the phase comparison, means for filtering the voltage from the phase comparator means to provide a filtered voltage, and a voltage-controlled oscillator connected to the filter means, to the first divider means and to the OR gate for providing the clock pulses in accordance with the filtered voltage to the first divider means and to the OR gate.

14. A torque meter as described in claim 13 further comprising second divider means for dividing the number of pulses in each group of pulses from the OR gate by twice the number of teeth on a wheel, third divider means connected to one of the coil means for dividing the number of pulses in the shaft pulse signal by the number of teeth on a wheel so as to provide a pulse every time the coil means' associated wheel has been turned through 360°, delay means connected to the third divider means for delaying the pulse from the third divider means to provide a delayed pulse to the second divider means, counter means connected to the second divider means and to the delay means for being periodically reset by the delayed pulse and for counting the number of pulses provided by the second divider means and for providing signals corresponding to the count, an AND gate connected to the detecting means and to the third divider means is controlled by the detection signal to pass or to block the pulses from the third divider means, latch means connected to the counter means and to the AND gate for storing the signal from the counter means in response to passed pulses from the AND gate so as not to change while the counter means is counting and so as not to enter signals from the counter means produced by the reverse rotation or by the erroneous shaft pulse signals and for providing digital signals corresponding to the stored signals.

15. A torque meter as described in claim 14 in which the detecting means includes a first flip-flop having a 'D' input connected to one of the coil means, a 'C' input connected to the other coil means and a Q output; first and second inverters connected to the one coil means and to the other coil means, respectively; a second flip-flop having a 'D' input connected to the first inverter, a 'C' input connected to the second inverter and a Q output; an OR gate having its inputs connected to the Q outputs of the first and second flip-flops and an output; a third inverter connected to the delay means; and a third flip-flop having a D input that is grounded, an 'S' input connected to the output of the OR gate, a 'C' input connected to the third inverter, and a $\overline{Q}$ output connected to the AND gate so that when the shaft is rotating in a proper direction the signal at the $\overline{Q}$ output of the third flip-flop is at a high logic level causing the AND gate to pass the pulses from the third divider means and when the shaft rotates in a reverse direction the signal at the $\overline{Q}$ output is at a low logic level causing the AND gate to block the pulses from the third divider means.

16. A torque meter as described in claim 15 further comprising a digital to analog converter connected to the latch means for converting the digital signals to an analog signal.

17. A torque meter as described in claim 16 further comprising display means connected to the latch means for providing a display corresponding to the torque of the shaft in accordance with the digital signals from the latch means.

18. A torque meter as described in claim 17 in which the counter means includes a counter connected to the second divider means and to the delay means for counting pulses from the second divider means and being reset by the delayed pulse to provide digital signals corresponding to the count, and preset means for presetting a count into the counter means corresponding to a known alignment error between the two wheels.

* * * * *